United States Patent Office 2,805,250
Patented Sept. 3, 1957

2,805,250
N-N-DIBENZYLSULFAMYL BENZOIC ACID

Werner Zerweck, Adolf Stachel, and Armin Kutzsche, Frankfurt am Main-Fechenheim, Germany, assignors to Cassella Farbwerke Mainkur Aktiengesellschaft, Frankfurt am Main-Fechenheim, Germany, a company of Germany No Drawing. Application July 11, 1955, Serial No. 521,396

Claims priority, application Germany July 15, 1954

1 Claim. (Cl. 260—518)

This invention concerns substances acting as retarding agents for the excretion of drugs.

We have now found that substances of an essentially greater effectiveness which delay the excretion of medicines such as para-aminosalicylic acid or penicillin, of X-ray contrast agents or of similar substances applied in the human body, are obtained by reacting carboxybenzene-sulfonic acids or their functional derivatives with dibenzylamine or its nuclear substitution products.

The products thus obtained correspond to the general formula

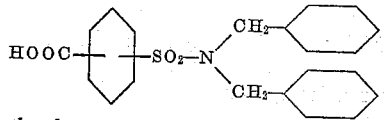

(wherein the benzene rings may contain further substituents).

They are strongly superior to the known excretion retarders, for example, to the commercially available para-carboxy-benzene-dipropyl-sulfamide. This is shown by the following experiments, in which a product of the present application, namely the

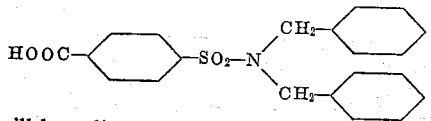

which will be called "benzyl compound" in the following statement, was compared to the known compound

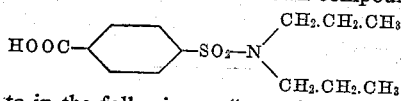

referred to in the following as "propyl compound." The comparisons as to the action of the two compounds were made in respect of para-aminosalicylic acid and of penicillin.

ACUTE TOXICITY

[Mouse per os in grams/kg. (the preparations were given in the form of substances).]

|  | benzyl compound | propyl compound |
|---|---|---|
| dos. tol | 4.0 | 1.0 |
| dos. let | 5.3 | 1.5 |

[Rat per os in g./kg. (in form of substance).]

|  | benzyl compound | propyl compound |
|---|---|---|
| dos. tol | 5.5 | 1.54 |
| dos. let | 10.0 | 1.66 |

[Mouse per os in g./kg. (after dissolution in dimethyl formamide).]

|  | benzyl compound | propyl compound | dimethyl formamide | aqueous dimethyl formamide 30% |
|---|---|---|---|---|
| dos. tol | 0.294 | 0.025 | 2.94 | 5.3 |
| dos. let | 0.59 | 0.066 | 5.0 | 7.1 |

CHRONIC TOXICITY

A daily dosage of $\frac{1}{10}$ of the dosis tole-rata of the benzyl compound and, in a second series of tests, of the propyl compound was given to mice during 14 days and the period of observation was extended for a further 4 weeks. No symptoms of illness or causes of death were noted and, in particular, no accumulation occurred.

Corresponding experiments with rabbits gave analogous results.

HISTOLOGY

A histologic study of the organs of mice and rabbits to which the aforesaid chronic doses were given, revealed no pathologic changes.

SYMPTOMS OF POISONING

Doses of 8.16 grams/kilogram of the benzyl compound given to mice led to death after 10 days without special clinic signs. An anaemia, a loss of haemoglobin and a leukocytosis occurred. Functional tests of liver and kidneys showed negative results. The inhibition of blood coagulation was about 17%. Histologic examinations revealed an enteritis and a cardiac liver of minor degree. The kidneys showed no functional damage. These findings were also made with the propyl compound. The changements in organs were not present with all animals.

RETARDATION OF THE EXCRETION OF PARA-AMINOSALICYLIC ACID (PAS)

The experiments to enhance the action of PAS after its oral administration by an additional oral application of the benzyl compound or the propyl compound which were given to the effect of (1) retarding the excretion
(2) raising the serum titers were carried out with rabbits. The individual animals behave different in this respect (as it is the case with the human body). Therefore the normal excretion of PAS after its oral administration was determined with each rabbit. Some days later the same animal received the same dossage of PAS, i. e. $\frac{1}{10}$ of the dosis tolerata, with the retarding agent to be examined. Each experiment as a whole was repeated for several times.

We marked on the X-axis the time and on the Y-axis the concentration. The planes formed by drawing the excretion curves were cut out and weighed. Thereby it was possible to compare the planes of action after a determination of the mean values.

According to Wilhelmi et al. (E. Wilhelmi and M. C. Sanz, Schweiz. Z. Tuberk. IX, 296–305 (1952); H. Steinlin and E. Wilhelmi, Schweiz. Z. Tuberk. IX, 306–312 (1952), only the values obtained for free PAS shall be used for an evaluation of excretion retarders.

| preparation | total PAS without retarder | total PAS with retarder | difference= change in plane of action | free PAS without retarder | free PAS with retarder | difference= change in plane of action |
|---|---|---|---|---|---|---|
| benzyl compound | 70.3 | 192.8 | 122.5 | 61.3 | 179.8 | 118.5 |
| propyl compound | 72.7 | 181.5 | 109.3 | 61.4 | 156.2 | 94.8 |

Values in milligrams = weight of curve plane.

When the value obtained for the propyl compound is shown as 100% the following relations are to be noted.

| preparation | total PAS in percent | free PAS in percent |
|---|---|---|
| propyl compound | 100 | 86.7 |
| benzyl compound | 112.1 | 108.4 |

The benzyl compound is better than the propyl compound. The percentage value of the total PAS with the benzyl compound is 112%, i. e. 12% higher than the corresponding value for the propyl compound. Related to propyl compound total PAS=100% there are with the benzyl compound 108.4% of free PAS, i. e. in fact 96% of the total PAS with the benzyl compound. This shows another property of the benzyl compound, namely to inhibit the acetylation of the para-aminosalicylic acid because only 4% appear as acetylated PAS whereas 13.3% do so with the propyl compound.

If one follows Wilhelmi et al. and uses only the values for free PAS for an evaluation of excretion retarders the relation 118.5:94.8, i. e. benzyl compound:propyl compound, shows a 25% superiority of the benzyl compound.

These results were obtained with ¼ of the amount necessary for molar equivalence to the propyl compound, which fact still emphasizes the significance of the benzyl compound.

RETARDATION OF THE EXCRETION OF PENICILLIN

As 28 experiments carried out with 14 rabbits have shown, an oral dosage of the benzyl compound delays the excretion of penicillin applied by intramuscular injection.

When comparing the propyl compound with the benzyl compound (propyl compound=100), the benzyl compound was found to be 41% better.

This is evidenced by the following report of experiments.

Influence of the propyl compound or benzyl compound upon the penicillin titers in the blood (total plane of action formed by the curve of the penicillin titers of the serum and the two axes "time" and "concentration").

| preparation | total plane of action of penicillin | difference with respect to penicillin alone | difference of the penicillin values between the series of the benzyl compound and that of the propyl compound (latter=100%) |
|---|---|---|---|
| | Mg. | Mg. | Percent |
| penicillin alone | 34.5 | X | X |
| penicillin+propyl compound | 170.4 | 135.9 | 100 |
| penicillin+benzyl compound | 240.5 | 206.0 | 151.5 |

(X) After deduction of the blank value.

The values given in the table were determined by weighing the planes of action.

[Average values of penicillin (units per 1 cubic centimeter of serum).]

| | after 3 hours | after 6 hours | after 9 hours |
|---|---|---|---|
| penicillin alone (37 experiments) | 1.43 | 0.61 | 0.18 |
| penicillin+propyl compound (7 experiments) | 9.14 | 2.3 | 0.54 |
| penicillin+benzyl compound (7 experiments) | 11.14 | 5.0 | 1.41 |

Summary

Sulfonamides of the constitution

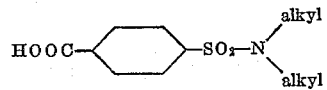

are known to be able to inhibit the excretion of drugs, for instance, para-aminosalicylic acid, penicillin or diodrast. Up to the present the para-carboxy-benzene-di-n-propyl-sulfamide ("propyl compound") is known to be the best of these compounds. In the course of our research, however, the para-carboxy-benzene-dibenzyl-sulfamide proved to be superior to the para-carboxy-benzene-di-n-propyl-sulfamide in respect of (1) Retardation of excretion (for free PAS about 25% for penicillin about 40%), (2) Increase of the titers of action (see preceding table)

| | after 3 hours | after 6 hours | after 9 hours |
|---|---|---|---|
| | Percent | Percent | Percent |
| compared to penicillin alone, increase= | 680 | 720 | 684 |
| compared to penicillin+propyl compound, increase= | 22 | 118 | 161 |

(3) Inhibition of the acetylation of PAS (3.3-fold better than the propyl compound), (4) Compatibility (about 4–10-fold according to species and solution).

As the propyl compound was up to now the best substance (better than f. i. the ethyl and the butyl compound) and our new benzyl compound is again better than all these compounds, the new benzyl compound shows a difference not in degree but in kind.

p-Carboxybenzene-dibenzyl-sulfamide in form of its sodium salt proved to be active as a retarding agent in the same way as the basic substance; the experiments have been carried out with rabbits using drugs such as penicillin or PAS. An application of the sodium salt which exhibits a good solubility with a marked susceptibility to carbonic acid is clinically of great significance in view of the use of dragées.

The following example is given for the purposes of illustrating the invention, the temperatures being in degrees centigrade.

EXAMPLE

Into an aqueous suspension of 591 grams (3 moles) of dibenzylamine in 500 cubic centimeters of distilled water there are introduced at 20°, with stirring, 220 grams (1 mol) of para-carboxy-benzene-sulfochloride. The temperature shall not exceed 25°. Thereafter the mass is still stirred for 10–12 hours at room temperature. After standardizing the mass with 20% hydrochloric acid to show a Congo-acidic reaction, the mixture of para-carboxybenzene-dibenzyl-sulfamide and dibenzylamine-chlorohydrate is separated by filtering with suction, dissolved in an excess of 2n-caustic soda lye and extracted with ether for several times in order to remove the dibenzyl-amine.

From the aqueous alkaline layer there is precipitated by means of diluted hydrochloric acid the para-carboxybenzene-dibenzyl-sulfamide. It is filtered by suction and washed with water until neutral. After recrystallizing from alcohol, the para-carboxy-benzene-dibenzyl-sulfamide is obtained in the form of white, felted needles of a melting point of 206°.

The ether is removed by distillation and the recovered dibenzyl-amine is used for further reactions.

Products of similar properties are obtained by using instead of the dibenzyl-amine or the carboxybenzene-sulfochloride their substitution products which may contain, for example, one or several hydroxy, alkyl or alkyloxy groups or halogen atoms; in this way are obtained, for example, p-Carboxybenzene-(benzyl - mono-m - methoxy - benzyl)-sulfamide (melting point: 155°, white laminae when crystallized from alcohol),
p-Carboxybenzene-(benzyl - mono - p - methoxy - benzyl)-sulfamide (melting point: 164°, white prisms),
p-Carboxybenzene-(benzyl - mono - p - chloro - benzyl)-sulfamide (melting point: 179–180°, white prisms when crystallized from alcohol).

We claim:
As a new retarding agent for the excretion of drugs which agent corresponds to the formula

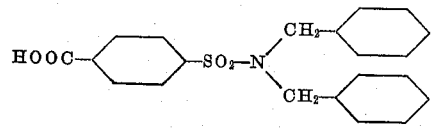

References Cited in the file of this patent
UNITED STATES PATENTS 2,608,507    Miller _____ Aug. 26, 1952
2,608,510    Sprague _____ Aug. 26, 1952